(12) United States Patent
Matsumoto et al.

(10) Patent No.: US 8,102,898 B2
(45) Date of Patent: Jan. 24, 2012

(54) CHANNEL ESTIMATING APPARATUS, CDMA RECEIVING APPARATUS, AND CHANNEL ESTIMATING METHOD

(75) Inventors: Mariko Matsumoto, Minato-ku (JP);
Shousei Yoshida, Minato-ku (JP);
Noriyuki Maeda, Yokohama (JP);
Junichiro Kawamoto, Yokohama (JP)

(73) Assignees: NEC Corporation, Tokyo (JP); NTT DoCoMo, Inc., Tokyo (JP)

( * ) Notice: Subject to any disclaimer, the term of this patent is extended or adjusted under 35 U.S.C. 154(b) by 1189 days.

(21) Appl. No.: 11/816,446

(22) PCT Filed: Feb. 24, 2006

(86) PCT No.: PCT/JP2006/303365
§ 371 (c)(1),
(2), (4) Date: Aug. 16, 2007

(87) PCT Pub. No.: WO2006/090812
PCT Pub. Date: Aug. 31, 2006

(65) Prior Publication Data
US 2009/0046588 A1 Feb. 19, 2009

(30) Foreign Application Priority Data

Feb. 25, 2005 (JP) ................................. 2005-051047

(51) Int. Cl.
*H04B 1/707* (2006.01)
(52) U.S. Cl. ....................................................... 375/147
(58) Field of Classification Search .................. 375/130, 375/140, 147, 316, 346, 148, 150
See application file for complete search history.

(56) References Cited

U.S. PATENT DOCUMENTS

2004/0203812 A1* 10/2004 Malladi et al. ................ 455/450
2006/0120440 A1* 6/2006 Reial ............................. 375/149

FOREIGN PATENT DOCUMENTS

| JP | 10-150327 A | 6/1998 |
| JP | 2000-252960 A | 9/2000 |
| JP | 2001-217747 A | 8/2001 |
| JP | 2001-267960 A | 9/2001 |
| JP | 2002-261670 A | 9/2002 |
| JP | 2004-7353 A | 1/2004 |
| JP | 2004-140514 A | 5/2004 |

OTHER PUBLICATIONS

Montemayor et al., Near-Optimum Iterative Estimation of Dispersive Multipath Channels, proceedings of the 48th IEEE Vehicular Technology Conference, 1998. (VTC 98), IEEE, May 18, 1998, vol. 3, pp. 2246-2250.*

(Continued)

*Primary Examiner* — Kevin M Burd
(74) *Attorney, Agent, or Firm* — Sughrue Mion, PLLC

(57) ABSTRACT

A corrected channel estimating apparatus is disclosed, which is capable of removing side-lobe components mutually leaking into transmission paths from channel estimates to increase the accuracy. A channel estimation unit calculates channel estimates for a plurality of transmission paths due to a signal that arrives through multipath. A channel estimate correction unit removes side-lobe components mutually leaking into the transmission paths from the channel estimates calculated by the channel estimation unit to correct the channel estimates. In this way, the corrected channel estimating apparatus estimates transmission paths of a multipath.

4 Claims, 4 Drawing Sheets

OTHER PUBLICATIONS

Kawamoto, et al., "Broadband DS-CDMA ni okeru Multipath Kansho Canceller o Mochiiru QRD-MLD ni okeru Sidelobe Jyokyo o Okonau Koseido Path Search Ho", IEICE Technical Report, RCS2004-56, May 21, 2004, pp. 1-6.

Falconer, et al., "Frequency Domain Equalization for Single-Carrier Broadband Wireless Systems", IEEE Communications Magazine, Wideband Wireless Access Technologies to Broadband Internet, Apr. 2002, pp. 58-66, IEEE.

Kawamura, et al., "Comparison Between Multipath Interference Canceller and Chip Equalizer with Other-Cell Interference Suppression in HSDPA in Multipath Channel", Technical Report of IEICE, RCS2002-38, CQ2002-38, Apr. 2002, pp. 123-128.

Carlos A. Montemayor et al., Near-Optimum Iterative Estimation of Dispersive Multipath Channels, Proceedings of the 48th IEEE Vehicular Technology Conference, 1998. (VTC 98), IEEE, May 18, 1998, vol. 3, pp. 2246-2250.

* cited by examiner

CHANNEL ESTIMATING APPARATUS, CDMA RECEIVING APPARATUS, AND CHANNEL ESTIMATING METHOD

TECHNICAL FIELD

The present invention relates to a channel estimating apparatus and a CDMA receiving apparatus using the same, and more particularly, to a corrected channel estimating apparatus which improves the accuracy of channel estimation, and a CDMA receiving apparatus using the same.

BACKGROUND ART

A DS-CDMA (Direct Sequence-Code Division Multiple Access) scheme can effectively suppress interference from other cells in a multi-cell environment. Thus, the DS-CDMA scheme can accomplish so-called one-cell repetition frequency assignment which uses the same frequency in adjacent cells, so that it is suitably used as a wireless access scheme for mobile communications.

The CDMA scheme can also achieve path diversity effects by separating transmission paths of multipath and rake combining them when de-spreading is performed.

In recent years, however, data communication traffic has been increased in addition to voice communications in mobile communications, so that larger capacities and higher speeds are desired. Then, multi-code based transmissions are required for enabling larger capacities and higher speeds. However, when the multi-code transmission is performed in a CDMA scheme, a problem arises in that the effective spreading gain is reduced which compromises the effect of suppressing multipath interference.

Accordingly, investigations have been made on equalization performed on a transmission path to recover orthogonality of multi-codes before despreading. Also, a variety of methods have been proposed as equalizing methods therefor. For example, there is a simple method which employs a linear filter (see, for example, Kawamura, Kishiyama, Higuchi, and Sawahashi, "Comparison in Characteristics between Multi-Path Interference Canceler and Chip Equalizer in Consideration of Removal of Other Cell Interference in HSDPA," Technical Report RCS2002-38, April 2002). There is also an equalizing method which employs frequency conversion (see, for example, D. Falconer et al, "Frequency Domain Equalization for Single-Carrier Broadband Wireless System," IEEE Commun. Mag., vol. 40, no. 4, pp. 58-66, April 2002).

FIG. 1 is a block diagram illustrating an exemplary configuration of a CDMA receiving apparatus which employs a conventional channel estimating apparatus. Referring to FIG. 1, the conventional CDMA receiving apparatus comprises path search unit 101, channel estimation units $102_1$-$102_L$, equalizer unit 105, and data de-spreading unit 108.

Path search unit 101 generates a transmission path delay profile using a pilot signal multiplexed on a received CDMA signal, and detects a plurality of paths which present higher reception levels from the delay profile. The paths detected by path search unit 101 are assigned to respective channel estimation units $102_1$-$102_L$.

Each of channel estimation units $102_1$-$102_L$ comprises pilot despreading unit 103 and symbol averaging unit 104.

For example, channel estimation unit $102_1$ comprises pilot despreading unit $103_1$ and symbol averaging unit $104_1$; channel estimation unit $102_2$ comprises pilot despreading unit $103_2$ and symbol averaging unit $104_2$; and so forth.

Pilot despreading unit $103_1$-$103_L$ despreads a pilot signal within a CDMA signal based on the timing of a path assigned thereto by path search unit 101.

Symbol averaging unit $104_1$-$104_L$ receives a despread pilot signal from pilot despreading unit $103_1$-$103_L$ on a path-by-path basis, and averages the despread pilot signal over a plurality of symbols to calculate channel estimates on a path-by-path basis.

Equalizer unit 105 comprises equalization weight calculation unit 106 and equalization filter 107.

Equalization weight calculation unit 106 receives channel estimates for the respective paths from channel estimation units $102_1$-$102_L$ to calculate weights used in equalization filter 107. There are a variety of methods of calculating weight W, including, for example, one using minimum mean square error (MMSE).

Using MMSE, weight W can be calculated by Equation (1):

$$W=(\hat{H}^H\hat{H}+\sigma^2 I)^{-1}\hat{H}^H \quad (1) \qquad \text{[Equation 1]}$$

where $$\hat{H} \qquad \text{[Equation 2]}$$

is a transmission path matrix which has a channel estimate of each path:

$$\hat{h}_i \qquad \text{[Equation 3]}$$

temporally shifted sample by sample and arranged in columns, and represented by Equation (2).

[Equation 4]

$$\hat{H} = \begin{pmatrix} \hat{h}_0 & & 0 \\ 0 & \hat{h}_0 & \\ \hat{h}_i & 0 & \ddots \\ & \hat{h}_i & \ddots & \hat{h}_0 \\ & & & \ddots & 0 \\ 0 & & & & \hat{h}_i \end{pmatrix} \quad (2)$$

Also, superscript $H$ indicates a transposed conjugate. $\sigma^2$ is noise power.

Equalization filter 107 equalizes a CDMA signal through filtering using a row vector on the central row of weight W calculated by equalization weight calculation unit 106.

FIG. 2 is a diagram illustrating an exemplary configuration of an equalization filter. Referring to FIG. 2, equalization filter 107, which is an FIR (Finite Impulse Response) filter, is composed of delays $21_1$-$21_{N-1}$, multipliers $22_1$-$22_N$, and adder 23.

Equalization filter 107 delays a received signal by delays $21_1$-$21_{N-1}$ in units of samples to generate outputs of respective taps, and multiplies the outputs of the respective taps by weights $w_0$-$w_{N-1}$ by multipliers $22_1$-$22_N$, and adds outputs of respective multipliers $22_1$-$22_N$ by adder 23.

Data despreading unit 108 demodulates a data signal by despreading the equalized signal generated by equalizer unit 105.

DISCLOSURE OF INVENTION

A corrected channel estimating apparatus separates transmission paths of multipath by multiplying a received signal by a complex conjugate of a known pilot signal to find channel estimates on a path-by-path basis.

Generally, since a signal of a communication scheme employing band limitation, such as CDMA, is limited in band by a roll-off filter, its impulse response has an extended side-lobe component. When multipath signal is separated by despreading, components at different timings are suppressed by a spreading gain if the spreading gain is sufficient. However, side-lobe components at the same timing are not suppressed by the despreading but leak into channel estimates to compromise the accuracy of the channel estimates, thus making it difficult to separate the paths when the paths are in close proximity.

FIG. 3 is a schematic diagram showing an exemplary relationship between the impulse response of a filter and multi-path. In the example of FIG. 3, three paths, i.e., path 1 at timing $\tau_0$, path 2 at timing $\tau_1$, and path 3 at timing $\tau_2$ exist in close proximity. For this reason, a side-lobe component of path 1 appears at timings $\tau_1$, $\tau_2$ of path 2, path 3. This side-lobe component of path 1 leaks into channel estimates of paths 2, 3 to compromise the accuracy of the channel estimates of paths 2, 3:

$$\hat{h}_1, \hat{h}_2 \qquad \text{[Equation 5]}$$

Also, similar to this, side-lobe components of paths 2, 3 leak into channel estimates of other paths to compromise the accuracy of the channel estimates.

Therefore, when timings of respective paths are in close proximity to one another, the conventional channel estimating apparatus fails to completely separate the respective paths, even if a sufficient processing gain can be provided, so that the accuracy of channel estimates is compromised due to the influence of the leak.

Also, a CDMA receiving apparatus employing the conventional channel estimating apparatus calculates equalization weights from channel estimates with lower accuracy, and performs equalization filtering using the equalization weights, and therefore suffers from lower equalization performance.

It is an object of the present invention to provide a channel estimating apparatus which is capable of calculating a corrected channel estimate, and a CDMA receiving apparatus using the same. It should be understood that the channel estimating apparatus provided by the present invention produces similar effects, as well, when it is employed in the receiving apparatus of different communication schemes which use band limitation.

To achieve the above object, a channel estimating apparatus of the present invention comprises a channel estimation unit for estimating transmission paths of multipath, and a channel estimate correction unit.

The channel estimation unit calculates channel estimates for a plurality of transmission paths from a signal which arrives through multipath. The channel estimate correction unit removes side-lobe components mutually leaking into the transmission paths from the channel estimates calculated by the channel estimation unit to correct the channel estimates.

Thus, according to the present invention, since the channel estimate correction unit removes the side-lobe components mutually leaking into the transmission paths from the respective channel estimates calculated by the channel estimation unit, the transmission paths can be estimated with high accuracy.

BEST MODE FOR CARRYING OUT THE INVENTION

A mode for carrying out the present invention will be described in detail with reference to the drawings.

Figure 4:
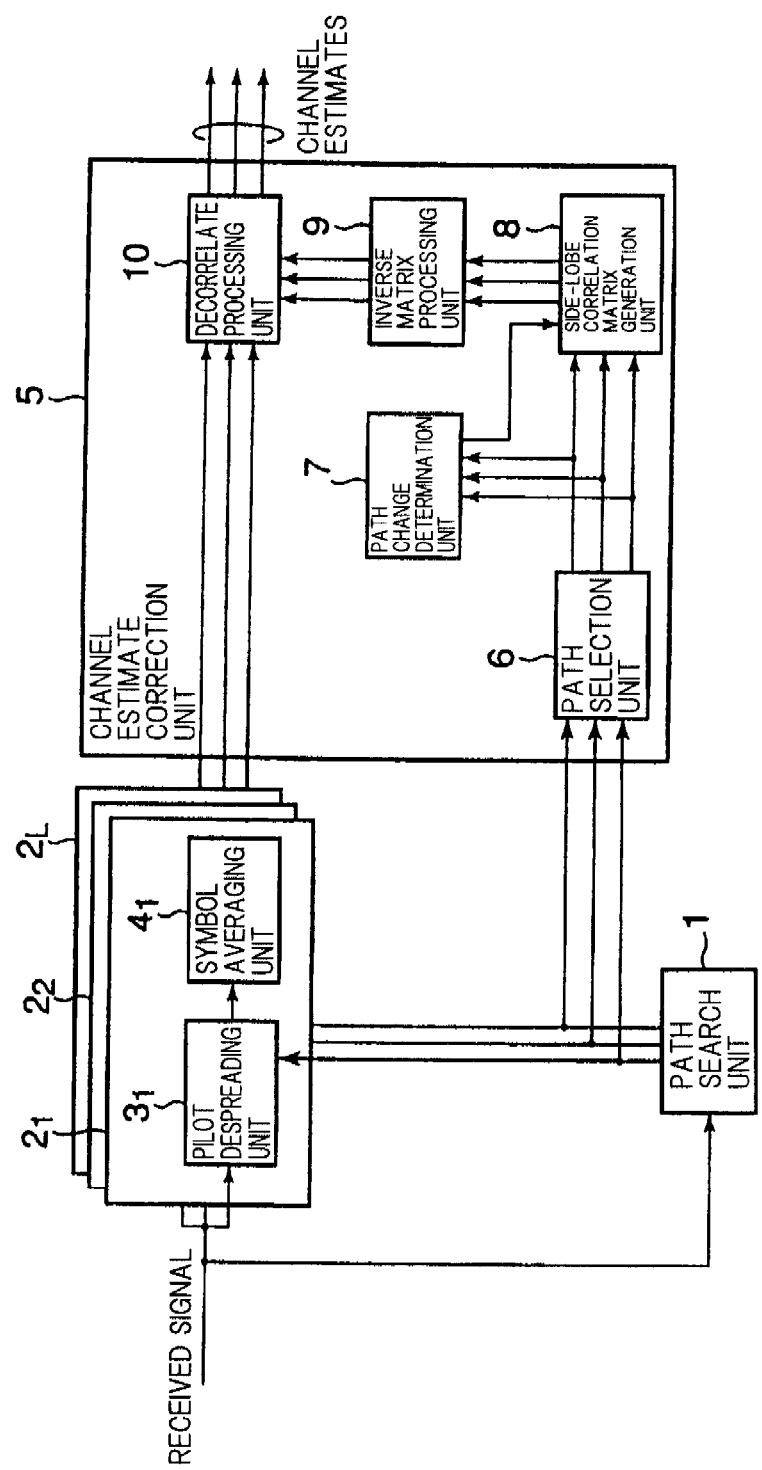
[FIG. 4] A block diagram illustrating a channel estimating apparatus according to a first exemplary embodiment of the present invention.

FIG. 4 is a block diagram illustrating a corrected channel estimating apparatus according to a first exemplary embodiment of the present invention. Referring to FIG. 4, the corrected channel estimating apparatus of this exemplary embodiment comprises path search unit 1, channel estimation units $2_1$-$2_L$, and channel estimate correction unit 5.

Path search unit 1 generates the delay profile of a transmission path using a pilot signal multiplexed on a received signal, and detects a plurality of paths which present higher reception levels from the delay profile.

Each of channel estimation units $2_1$-$2_L$ comprises pilot despreading unit 3 and symbol averaging unit 4. For example, channel estimation unit $2_1$ comprises pilot despreading unit 3 and symbol averaging unit $4_1$; channel estimation unit $2_2$ comprises pilot despreading unit $3_2$ and symbol averaging unit $4_2$; and so forth.

Pilot despreading unit $3_1$-$3_L$ multiplies a received signal by a complex conjugate of a pilot signal based on the timing of a path assigned thereto by path search unit 1.

Symbol averaging unit $4_1$-$4_L$ receives a despread pilot signal from pilot despreading unit $3_1$-$3_L$ on a path-by-path basis, and averages the despread pilot signal over a plurality of symbols to calculate a channel estimate on a path-by-path basis.

Channel estimate correction unit 5 comprises path selection unit 6, path change determination unit 7, side-lobe correlation matrix generation unit 8, inverse matrix processing unit 9, and decorrelate processing unit 10.

Path selection unit 6 selects, from among a plurality of paths detected by path search unit 1, paths which have timing differences from all other paths equal to or larger than a predetermined value as not eligible for correction, and paths which have timing differences from any of other paths smaller than the predetermined value as eligible for correction. This timing difference is the difference between timings at which signals of respective paths included in a multi-path arrive. When paths are separated by sufficient intervals, the influence of side-lobe components can be neglected, so that the amount of processing is reduced by selecting paths which need no correction, as not eligible.

Path change determination unit 7 determines whether or not each path detected by path search unit 1 and selected by path selection unit 6 has changed in timing from the preceding detection.

Side-lobe correlation matrix generation unit 8 generates a correlation matrix, from the result of the determination made by the path change determination unit 7, that is indicative of amounts of leak side-lobe components, due to the timing differences between respective paths, when paths have changed in timing.

Figure 3:
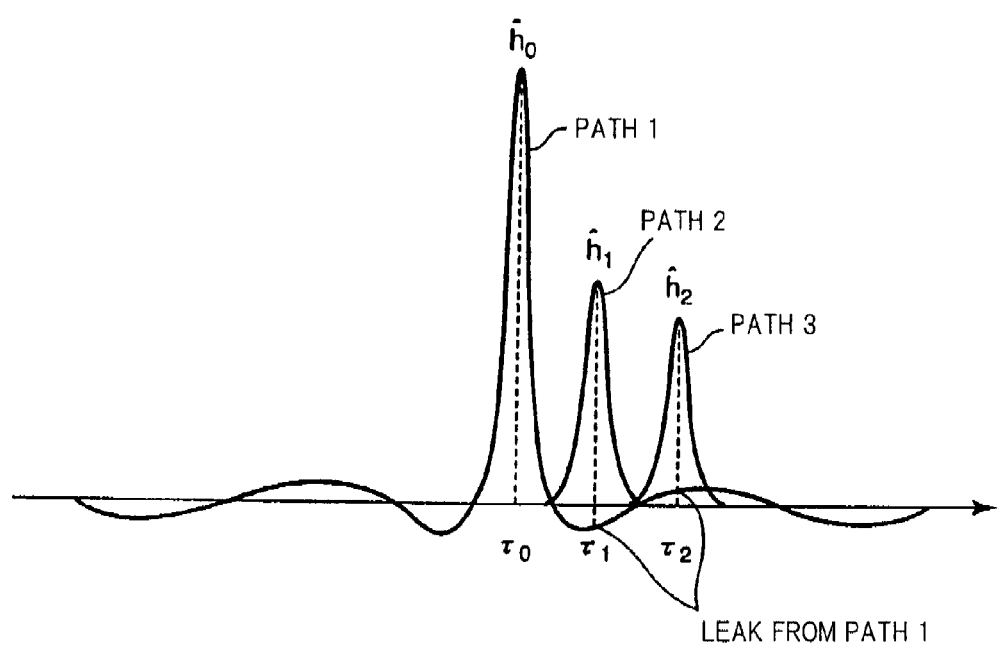
[FIG. 3] A schematic diagram showing an exemplary relationship between the impulse response of a filter and a multipath.

For example, when three paths exist in close proximity as shown in FIG. 3, side-lobe correlation matrix R is represented by Equation (3):

[Equation 6]

$$R = \begin{pmatrix} h_{RC}(0) & h_{RC}(\tau_0 - \tau_1) & h_{RC}(\tau_0 - \tau_2) \\ h_{RC}(\tau_1 - \tau_0) & h_{RC}(0) & h_{RC}(\tau_1 - \tau_2) \\ h_{RC}(\tau_2 - \tau_0) & h_{RC}(\tau_2 - \tau_1) & h_{RC}(0) \end{pmatrix} \quad ()$$

where $h_{RC}(t)$ is the impulse response of a roll-off filter, which is represented by Equation (4):

[Equation 7]

$$h_{RC}(t) = \frac{\sin(\pi/T_c)}{\pi/T_c} \frac{\cos(\pi\alpha/T_c)}{1-(2\alpha/T_c)^2} \quad (4)$$

where is a roll-off rate, and $T_c$ is a tip cycle.

As can be understood from Equation (3) and Equation (4), side-lobe correlation matrix R depends only on timing differences between the paths, but does not depend on channel estimates:

$$\hat{h}_i \quad \text{[Equation 8]}$$

Thus, side-lobe correlation matrix R is needed to be regenerated when a change in path timing occurs.

The channel estimates, $$\hat{h}_i \quad \text{[Equation 9]}$$

which are outputs of channel estimation units $2_1$-$2_L$, are sums of products of elements of side-lobe correlation matrix R and actual transmission path values $h_i$, and are represented by Equation (5):

[Equation 10]

$$\begin{pmatrix} \hat{h}_0 \\ \hat{h}_1 \\ \hat{h}_2 \end{pmatrix} = R \begin{pmatrix} h_0 \\ h_1 \\ h_2 \end{pmatrix} \quad (5)$$

Inverse matrix processing unit 9 finds the inverse matrix of side-lobe correlation matrix R. Inverse matrix processing unit 9 may employ a method which involves a reduced amount of processing, such as an LU decomposition method, a Cholesky decomposition method or the like.

Decorrelate processing unit 10 calculates the sums of products of elements of inverse matrix $R^{-1}$ of R and channel estimates:

$$\hat{h}_i \quad \text{[Equation 11]}$$

by Equation (6) to calculate actual transmission path values $h_i$ that mutual leaks of channel estimates:

$$\hat{h}_i \quad \text{[Equation 12]}$$

are removed.

[Equation 13]

$$\begin{pmatrix} h_0 \\ h_1 \\ h_2 \end{pmatrix} = R^{-1} \begin{pmatrix} \hat{h}_0 \\ \hat{h}_1 \\ \hat{h}_2 \end{pmatrix} \quad (6)$$

While a reduction in power consumption is important in a wireless mobile device, the processing amount of inverse matrix processing 9 is not small in this exemplary embodiment. Generally, however, since a path timing changing speed is lower than a fading varying speed, a path search cycle can be set longer than a channel estimation cycle. In doing so, it is possible to reduce the processing amount of inverse matrix processing 9 per channel estimation cycle to an allowable range or less.

Also, in this exemplary embodiment, path selection unit 6 narrows down part of the paths for which the side-lobe correlation matrix is generated, and side-lobe correlation matrix generation unit 8 generates the side-lobe correlation matrix only when a change in path timing is detected by path change detection unit 7, thereby allowing for a reduction in the processing amount. However, path selection unit 6 and path change determination unit 7 are not essential components, and can be omitted if the processing amount does not need to be reduced.

As described above, according to this exemplary embodiment, channel estimation units $2_1$-$2_L$ calculate respective channel estimates, and channel estimate correction unit 5 removes side-lobe components mutually leaking into respective paths from the respective channel estimates, using timing differences between respective paths to correct the channel estimates, thus making it possible to achieve highly accurate channel estimates.

In this event, in channel estimate correction unit 5, side-lobe correlation matrix generation unit 8 generates the correlation matrix indicative of side-lobe component leak coefficients due to timing differences between respective paths which detected by path search unit 1, independently of the channel estimates, inverse matrix calculation unit 9 calculates the inverse matrix of the correlation matrix, and decorrelate processing unit 10 removes leaking side-lobe components from the channel estimates using the inverse matrix. Accordingly, the correlation matrix for use in removing the leaks need not be processed each time the channel estimates change.

Also, in channel estimate correction unit 5, path selection unit 6 excludes those paths that have timing differences equal to or larger than a predetermined value from other paths, and that are less affected by leaking side-lobes from paths eligible for correction, so that the processing amount can be reduced.

Also, since channel estimate correction unit 5 determines a change in path timing in path change determination unit 7, and calculates the correlation matrix only when a change is found in path timing, the processing amount can be reduced.

A CDMA receiving apparatus is shown as another exemplary embodiment of the present invention.

Figure 5:
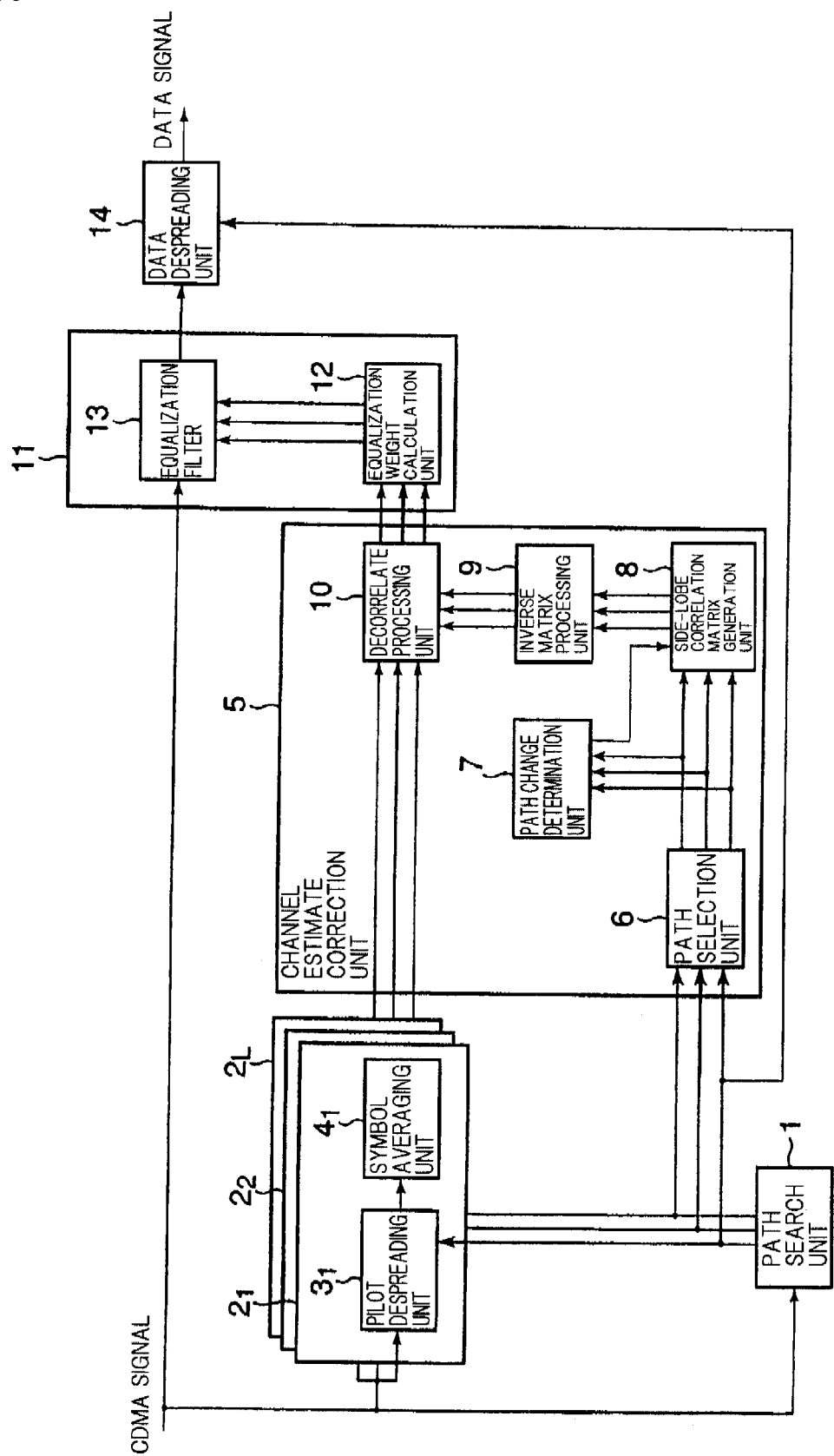
[FIG. 5] A block diagram illustrating the configuration of a CDMA receiving apparatus according to another exemplary embodiment of the present invention.

FIG. 5 is a block diagram illustrating the configuration of a CDMA receiving apparatus according to another exemplary embodiment of the present invention. Referring to FIG. 5, the CDMA receiving apparatus comprises path search unit 1, channel estimation units $2_1$-$2_L$, channel estimate correction unit 5, equalizer unit 11, and data despreading unit 14.

Path search unit 1 is similar to that of the first exemplary embodiment illustrated in FIG. 4.

Each of channel estimation units $2_1$-$2_L$ comprises pilot despreading unit 3 and symbol averaging unit 4. For example, channel estimation unit $2_1$ comprises pilot despreading unit $3_1$ and symbol averaging unit $4_1$; channel estimation unit $2_2$ comprises pilot despreading unit $3_2$ and symbol averaging unit $4_2$; and so forth.

Pilot despreading unit $3_1$-$3_l$ despreads a pilot signal within a CDMA signal based on the timing of a path assigned thereto by path search unit 1.

Equalizer unit 11 comprises equalization weight calculation unit 12 and equalization filter 13.

Equalization weight calculation unit 12 receives a channel estimate of each path corrected by channel estimate correction unit 5, and calculates weights used by equalization filter 13. There are a variety of methods of calculating weights W, including, for example, a method using MMSE. With the use of MMSE, weights can be calculated by Equation (1).

Figure 1:
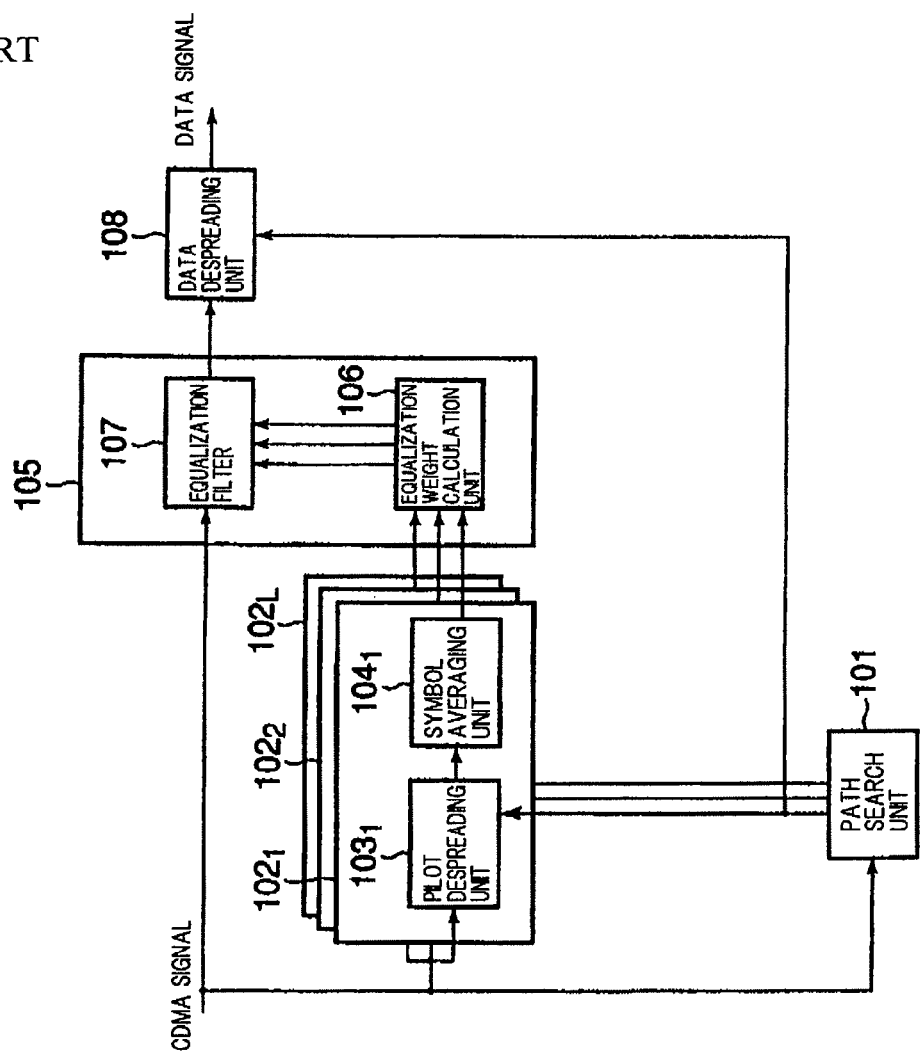
[FIG. 1] A block diagram illustrating the configuration of a CDMA receiving apparatus which employs a conventional channel estimating apparatus.
Figure 2:
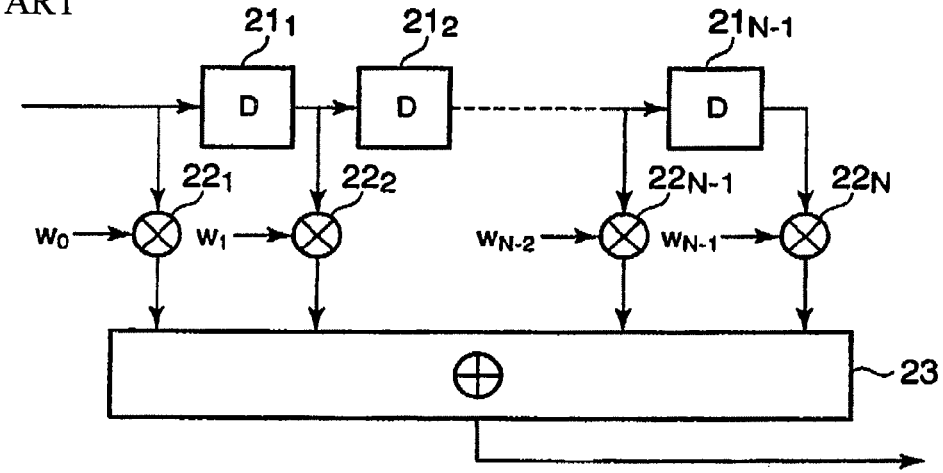
[FIG. 2] A diagram illustrating an exemplary configuration of an equalization filter.

Equalization filter 13 equalizes a signal through filtering using a row vector at the center of weights W calculated by equalization weight calculation unit 12 as tap weights. An example of equalization filtering has been shown in FIG. 2. Referring to FIG. 2, equalization filter 107, which is an FIR filter, is composed of delays $21_1$-$21_{N-1}$, multipliers $22_1$-$22_N$, and adder 23.

Equalization filter 13 delays a received signal by delays $21_1$-$21_{N-1}$ in units of samples to generate outputs of respective taps, and multiplies the outputs of the respective taps by weights $w_0$-$w_{N-1}$ by multipliers $22_1$-$22_N$, and adds outputs of respective multipliers $22_1$-$22_N$ by adder 23.

Data despreading unit 14 demodulates a data signal by despreading an equalized signal generated by equalizer unit 11.

As described above, according to this exemplary embodiment, channel estimation units $2_1$-$2_L$ find respective channel estimates, and channel estimate correction unit 5 removes side-lobe components mutually leaking into the respective paths, equalizer unit 11 equalizes signals with accurate weights calculated using accurate channel estimates from which the leaks have been removed, and data despreading unit 14 despreads a signal from equalizer unit 11, so that accurate received data can be reproduced.

In this exemplary embodiment, equalizer unit 11 performs equalization filtering as signal processing in a time domain, but the present invention is not so limited. Equalizer unit 11 may also perform the weight calculation and equalization filtering as signal processing in a frequency domain, in which case similar advantages can be also produced to those of the exemplary embodiment.

Also, while the exemplary embodiment has illustrated a CDMA receiving apparatus which is assumed to comprise one transmission and one reception antenna, the present invention is not limited to this configuration. As another example, the present invention can also be applied to an MIMO (Multiple Input Multiple Output) system which comprises a plurality of transmission and reception antennas, respectively.

Also, the CDMA receiving apparatus of the exemplary embodiment can be applied to any base station wireless device and a mobile station wireless device in a mobile communications system.

The invention claimed is:

1. A corrected channel estimating apparatus for estimating transmission paths of a multipath, comprising:
    a channel estimation unit for calculating channel estimates for a plurality of transmission paths from a signal arriving through a multipath; and
    a channel estimate correction unit for removing side-lobe components mutually leaking into the transmission paths, from the channel estimates calculated by said channel estimation unit, to correct the channel estimates,
    wherein said channel estimate correction unit calculates values, which exclude the side-lobe components mutually leaking into the transmission paths from the channel estimates, by using the channel estimates for a plurality of the transmission paths calculated by said channel estimation unit and by using timing differences between the plurality of respective transmission paths,
    wherein said channel estimate correction unit generates coefficients by using timing differences between the plurality of respective transmission paths, and removes the leaking side-lobe components from the channel estimates by calculating the sums of products of the coefficients and the channel estimates calculated by said channel estimation unit, and
    wherein said channel estimate correction unit comprises:
    side-lobe correlation matrix generation unit for generating a correlation matrix indicative of the amounts of leaking side-lobe components due to the timing differences between the plurality of respective transmission paths, an inverse matrix processing unit for calculating an inverse matrix of the correlation matrix generated by said side-lobe correlation matrix generation unit, and a decorrelate processing unit for removing the leaking side-lobe components from the channel estimates by calculating the sums of products of the inverse matrix calculated by said inverse matrix processing unit and the channel estimates calculated by said channel estimation unit.

2. The corrected channel estimating apparatus according to claim 1, wherein said channel estimate correction unit further comprises a path change determination unit for detecting a change in timing of the transmission path, wherein said side-lobe correlation matrix generation unit generates the correlation matrix when said path change determination unit detects the change in path timing.

3. The corrected channel estimating apparatus according to claim 1, wherein said channel estimate correction unit further comprises a path selection unit for selecting transmission paths which present a timing difference less than a predetermined value from any of the other transmission paths, as eligible for correction.

4. The corrected channel estimating apparatus according to claim 2, wherein said channel estimate correction until further comprises a path selection unit for selecting transmission paths which present a timing difference less than a predetermined value from any other transmission paths, as eligible for correction.

* * * * *

UNITED STATES PATENT AND TRADEMARK OFFICE
CERTIFICATE OF CORRECTION

PATENT NO. : 8,102,898 B2
APPLICATION NO. : 11/816446
DATED : January 24, 2012
INVENTOR(S) : Mariko Matsumoto et al.

It is certified that error appears in the above-identified patent and that said Letters Patent is hereby corrected as shown below:

In the Specifications:

Column 4, Line 36: delete "3" and insert -- $3_1$ --

Column 7, Line 7: delete "$3_1$-$3_l$" and insert -- $3_1$-$3_L$ --

Signed and Sealed this
Sixth Day of August, 2013

Teresa Stanek Rea
*Acting Director of the United States Patent and Trademark Office*